Nov. 28, 1961 A. R. BLACKBURN ET AL 3,010,176
METHOD OF MOLDING CERAMIC WARE
Filed May 17, 1956 9 Sheets-Sheet 1
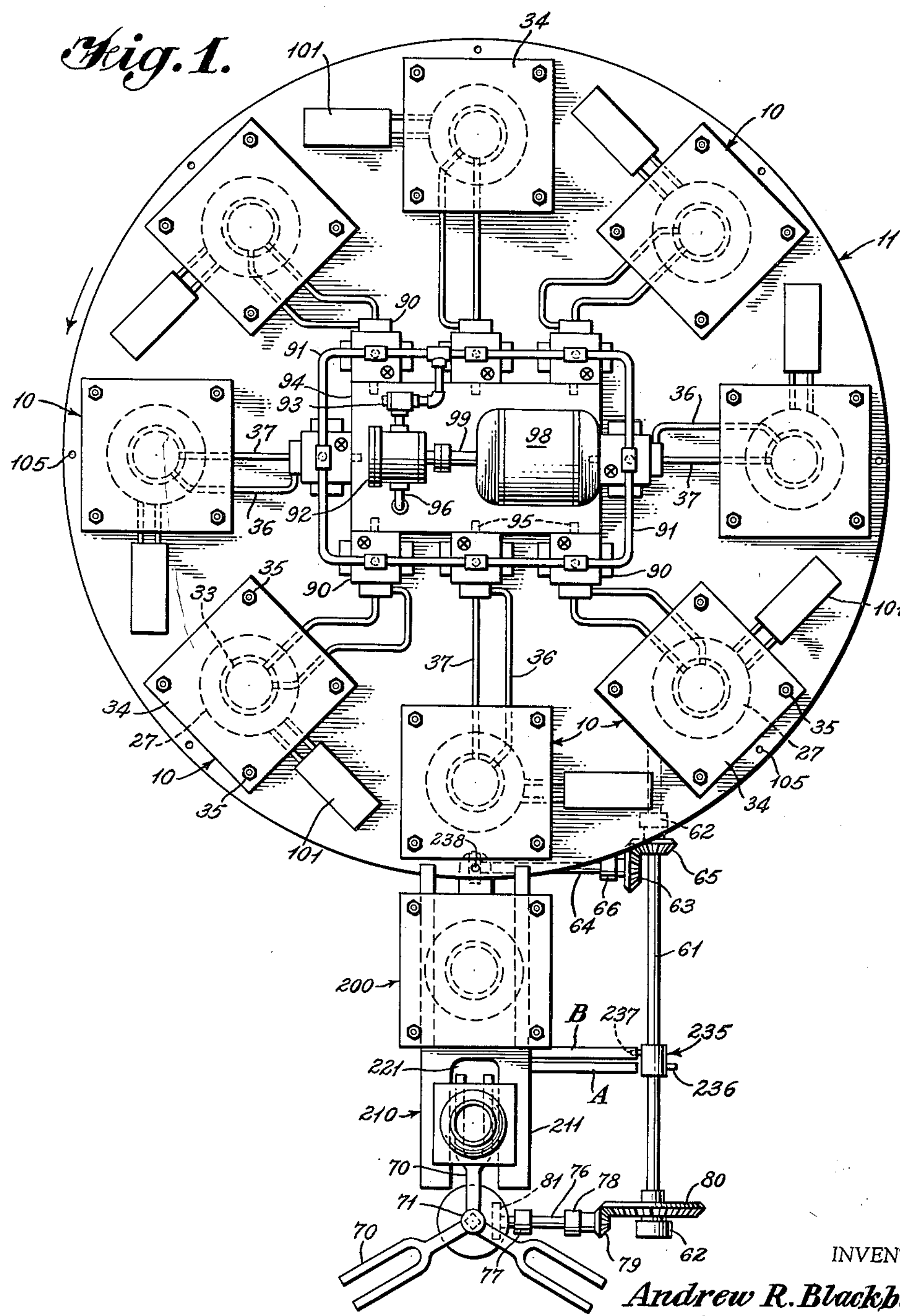
INVENTORS
Andrew R. Blackburn
and Richard E. Steele
BY Burns, Doane, Benedict & Irons
ATTORNEYS METHOD OF MOLDING CERAMIC WARE
Filed May 17, 1956 9 Sheets-Sheet 2
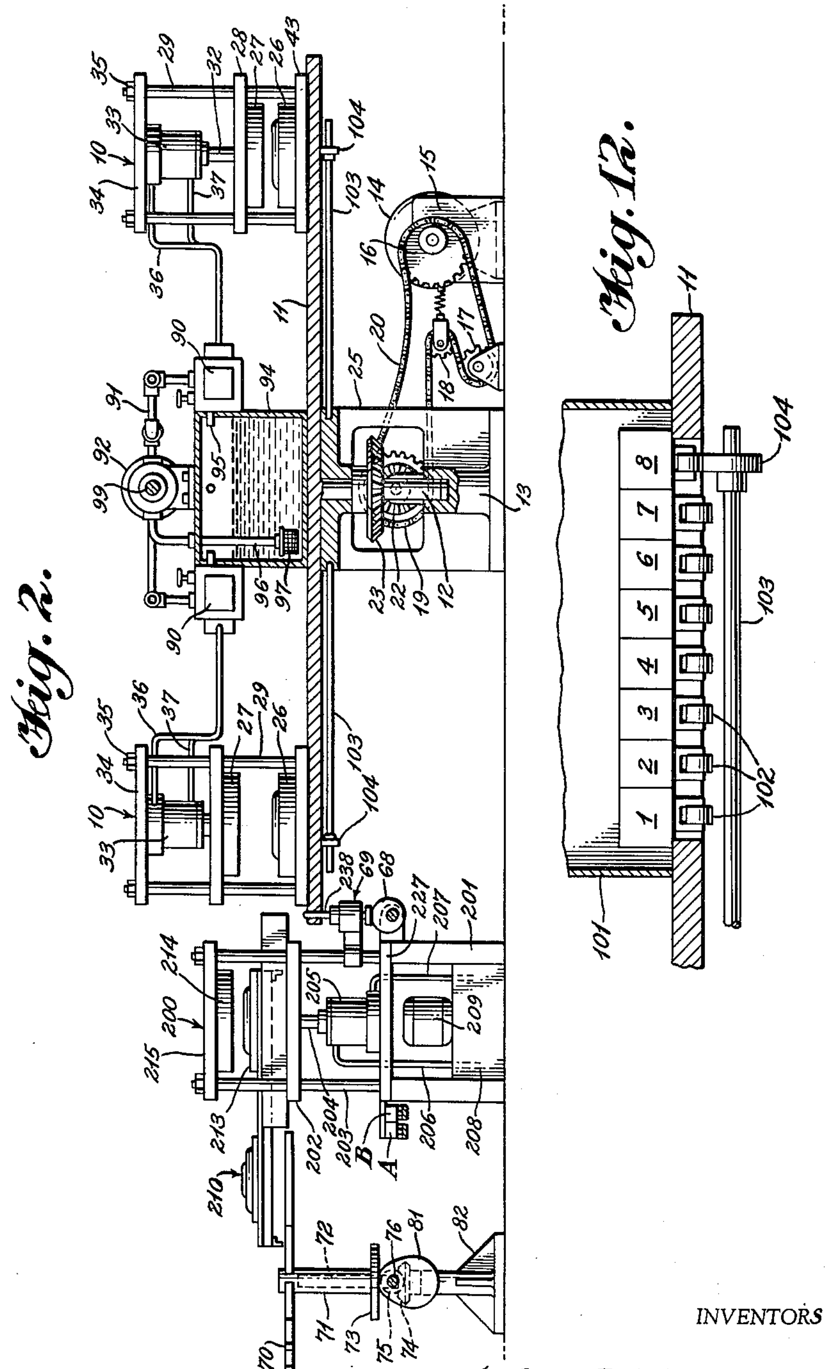
INVENTORS
Andrew R. Blackburn
and Richard E. Steele
BY Burns, Doane, Benedict & Irons
ATTORNEYS METHOD OF MOLDING CERAMIC WARE
Filed May 17, 1956 9 Sheets-Sheet 3
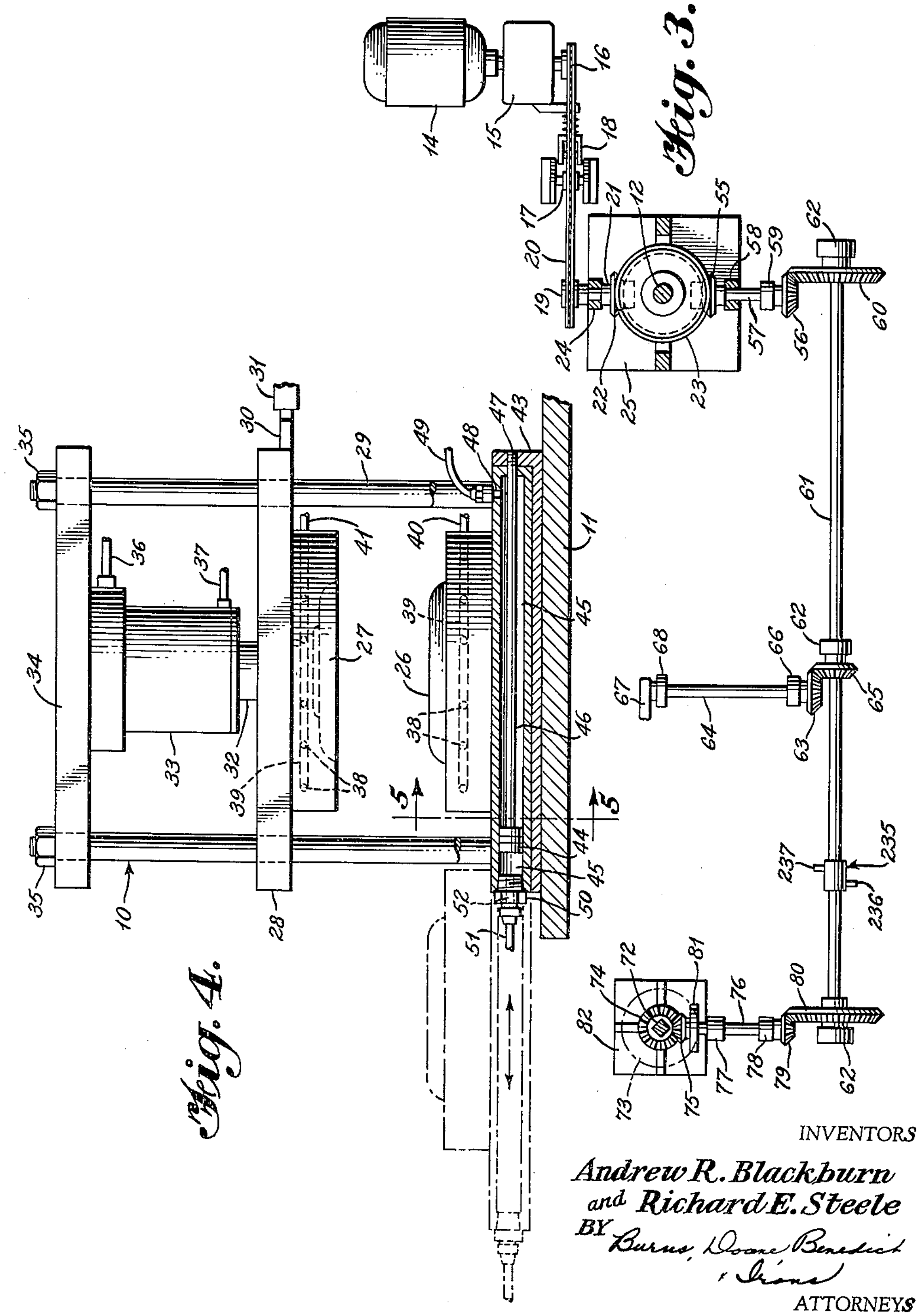
INVENTORS
Andrew R. Blackburn
and Richard E. Steele
BY Burns, Doane, Benedict & Irons
ATTORNEYS METHOD OF MOLDING CERAMIC WARE
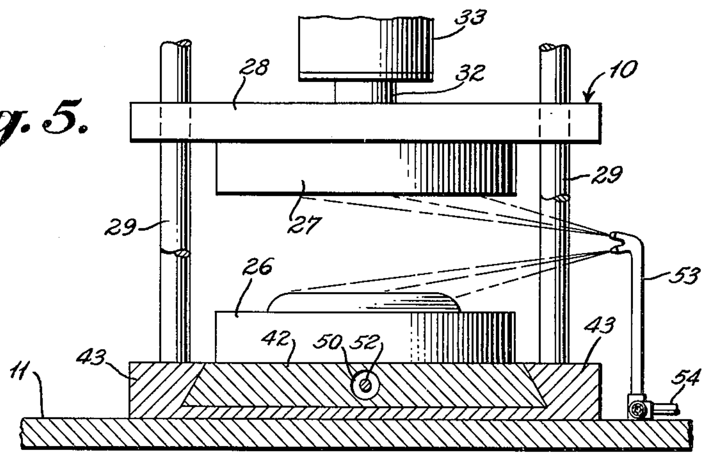
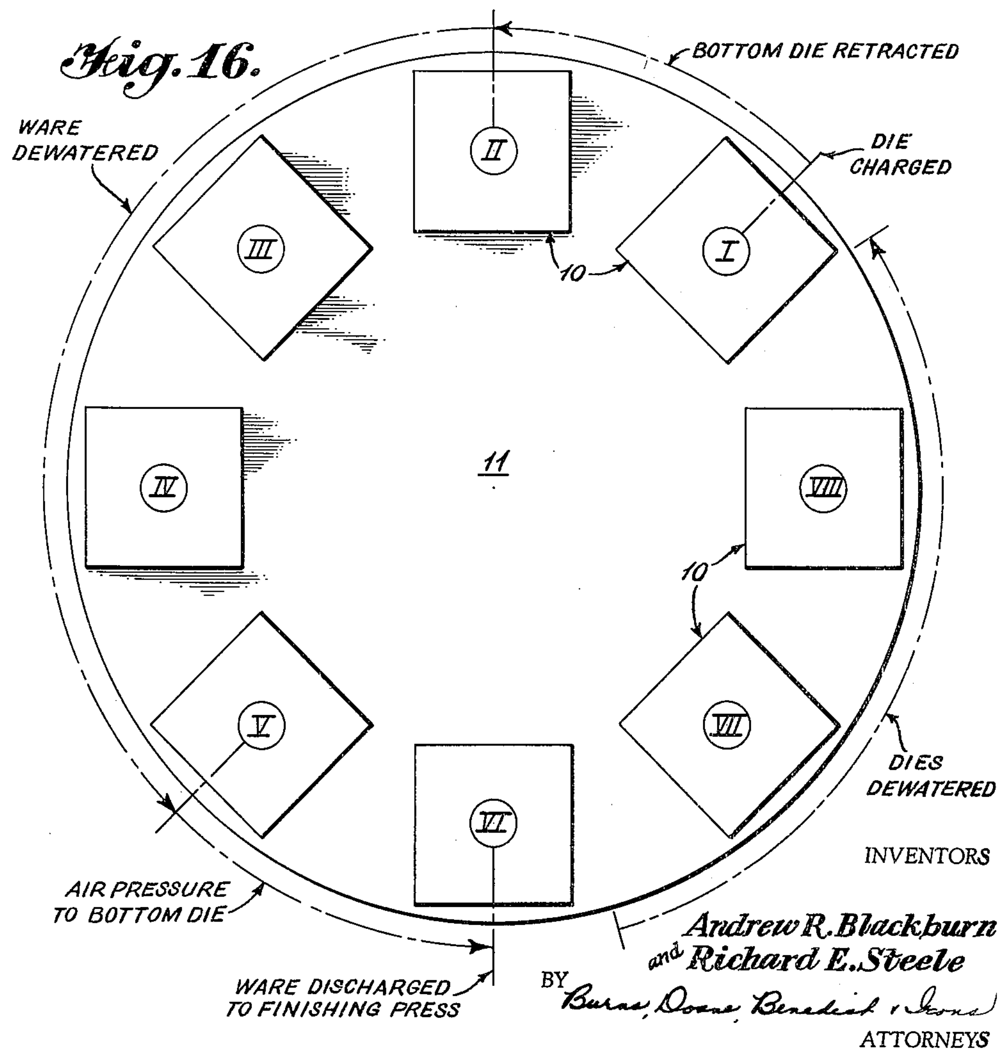
INVENTORS
Andrew R. Blackburn
and Richard E. Steele
BY Burns, Doane, Benedict & Irons
ATTORNEYS METHOD OF MOLDING CERAMIC WARE
Filed May 17, 1956 9 Sheets-Sheet 5
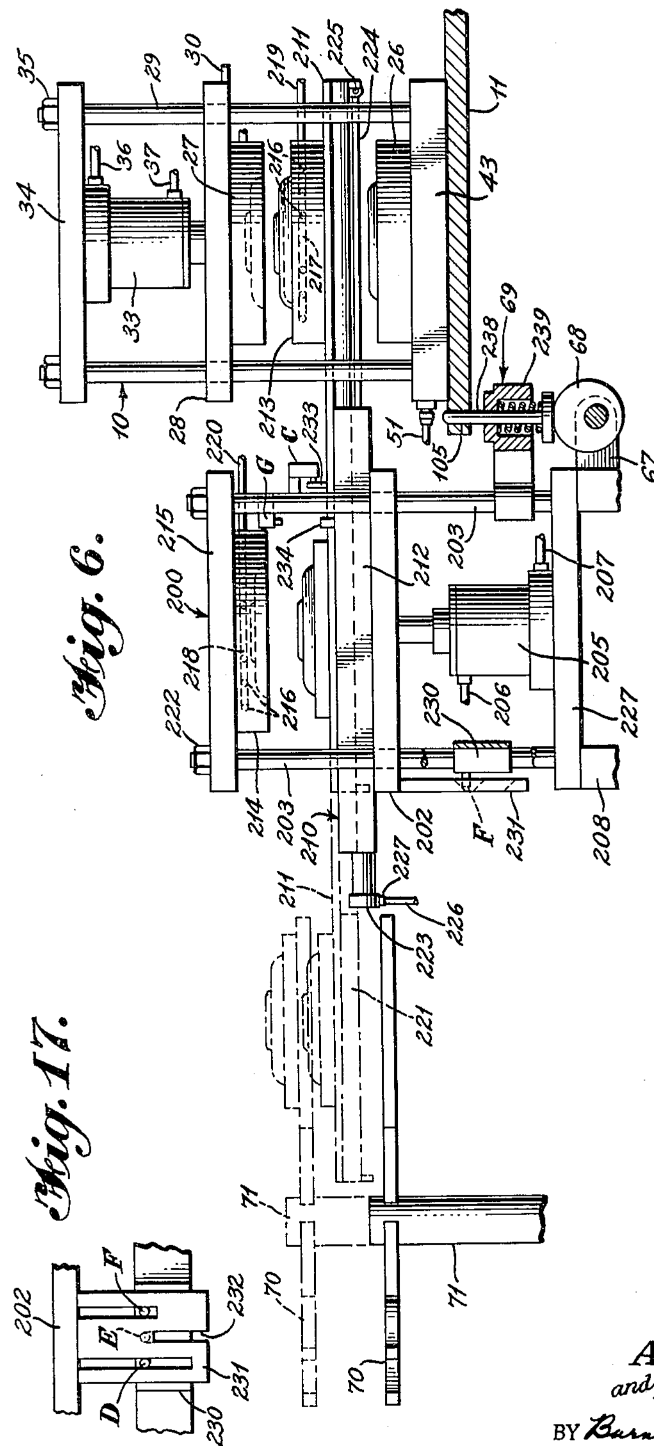
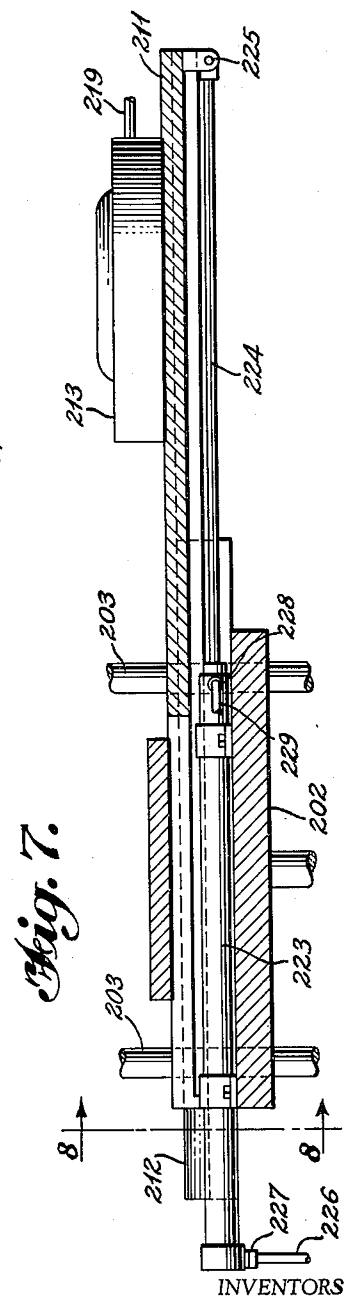
INVENTORS
Andrew R. Blackburn
and Richard E. Steele
BY Barnes, Doane, Benedict & Irons
ATTORNEYS INVENTORS
Andrew R. Blackburn
and Richard E. Steele
BY Burns, Doane, Benedict & Irons
ATTORNEYS

METHOD OF MOLDING CERAMIC WARE

Filed May 17, 1956 9 Sheets-Sheet 7

INVENTORS
Andrew R. Blackburn
and Richard E. Steele
BY Burns, Doane, Benedict & Irons
ATTORNEYS

METHOD OF MOLDING CERAMIC WARE

Filed May 17, 1956 9 Sheets-Sheet 8

INVENTORS
Andrew R. Blackburn
and Richard E. Steele
BY Burns, Doane, Benedict & Irons
ATTORNEYS

METHOD OF MOLDING CERAMIC WARE

Filed May 17, 1956 9 Sheets-Sheet 9

INVENTORS
Andrew R. Blackburn
and Richard E. Steele
BY Berns, Doane, Benedict & Irons
ATTORNEYS 3,010,176

METHOD OF MOLDING CERAMIC WARE

Andrew R. Blackburn, Westerville, and Richard E. Steele, Worthington, Ohio, assignors to Ram Incorporated, Columbus, Ohio, a corporation of Michigan Filed May 17, 1956, Ser. No. 585,429
5 Claims. (Cl. 25—156)

This invention relates to molding methods and, more particularly, to methods for manufacturing ceramic ware, such as artware, dinnerware, electric porcelain, and the like, from plastic clay.

Ceramic ware of this description traditionally has been formed by the conventional methods of jiggering and casting and, in normal processing, must remain in its forming mold until dry enough to permit handling. Of necessity, therefore, the manufacture of ceramic ware by jiggering or casting requires a large area of operations and necessitates use of space-consuming drying apparatus both for effecting release of the ware from the molds and for additional drying of the ware preparatory to subsequent processing steps. Additionally, the multiplicity of molds required in such operations makes real uniformity of product a practical impossibility and greatly adds to the expense of the operation.

More recently, in an effort to improve the uniformity of product and increase production, various semi-automatic and automatic molding machines have been developed. While these machines have been moderately successful, they have usually involved complicated procedures involving a plurality of pressing steps in the dewatering and shaping of the ware and have required transfer of the ware from one to another of several forming or molding faces. Single pressing operations employed by the art have been unduly time consuming and production rate has been undesirably low. The high pressures employed have, moreover, produced strains in the pressed ware which either have caused crack formation during drying operations, or else have produced undesired points of weakness in the fired ware. Single step, high pressure pressing further has been found undesirable due to the tendency of the pressed ware to return to the configuration of the clay batt as soon as the pressure is released. In addition, none of the semi-automatic or automatic apparatus of the prior art has satisfactorily produced ware which has been dewatered to the point of substantially no drying shrinkage and which can be handled unsupported in the final drying operations.

In view of these and other shortcomings of prior art methods, it is the general object of this invention to present improved methods for manufacturing ceramic ware.

A primary object of this invention is a method whereby ceramic ware of high and uniform quality can be produced.

A special object of the invention is a method for molding ceramic bodies whereby plastic clay bodies can, if desired, be shaped and dewatered in a single pressing operation.

A further object of the invention is a method whereby clay bodies may be dewatered and shaped in one pressing operation without adverse effect to either the forming surfaces or the ware itself.

Yet another object of the invention is a process whereby clay bodies may be dewatered to the point where substantially no shrinkage is obtained in subsequent drying operations.

An additional object of the invention is a method whereby a smoother and more uniform finish may be obtained with a single dewatering step and a single finishing step.

Another object of the invention is a method wherein efficient use may be made of vacuum during dewatering of the ware.

A further object of the invention is a process for shaping and dewatering clay bodies wherein a multiplicity of molds and space-consuming drying means are unnecessary.

A still further object of the invention is a method whereby dewatered and surface finished ware may be produced which may subsequently be handled in unsupported condition in subsequent processing steps.

A still further object of the invention is a method capable of producing dewatered and shaped ware which may be fired to produce ceramic objects characterized by a smoother, more uniform surface.

The realization of these and other objects will be apparent from the following description of the invention.

Generally described, the method of the invention comprises rapidly applying dewatering pressure to a water-containing clay body until the body is partially dewatered and partially shaped and then slowly applying dewatering pressure to gradually complete the dewatering and shaping of the clay body. In terms of apparatus, the present invention may be geenrally described as apparatus for the manufacture of ceramic ware which in combination comprises a dewatering press having mating male and female die members for dewatering and shaping clay bodies, die closure means for effecting pressurized closure of said die members, and control means associated with the closure means to effect rapid closure of the die members for the major portion of the dewatering and shaping operation and to effect slow closure of the die members for the remaining portion of the said operation.

In a preferred embodiment of the apparatus of the invention, the male and female mating dies of the dewatering press will be formed from porous materials such as plaster of Paris, hard gypsum cement, or the like, and will be equipped with means for applying fluid pressure through the molding surface or exhausting air from the porous die body and through the forming surface thereof. In the preferred embodiment of the method of the invention, vacuum is applied to the porous dewatering die members throughout the dewatering operation. Preferably, a plurality of dewatering dies or presses will be operated with a single finishing press. The operation of the dewatering presses and the finishing press desirably will be synchronized. Preferably, the die members of the finishing press will also be formed from a suitable porous material and provision will be made for introducing fluid pressure into the porous die members. Desirably, both the dewatering presses and the finishing press will be hydraulically actuated.

In a further preferred embodiment of the apparatus of the invention, the dewatering presses are mounted on a rotatable turntable which is preferably operated by means of an electric motor and a suitable mechanical drive mechanism. A synchronously operated finishing press is disposed adjacent the turntable and means are provided for transferring the dewatered ware to the finishing press for the finishing operation. Ware transfer means are provided in preferred embodiments to remove the finished ware from the finishing press and transfer the dewatered and finished ware to a final drying means.

Having generally described the method of the invention, a more complete description of a specific embodiment thereof will be presented in conjunction with the drawing in which like symbols refer to like structural elements.

In the drawings:

FIG. 1 is a plan view of a preferred form of apparatus showing a turret with dewatering presses, a finishing press, and a ware transfer mechanism.

FIG. 2 is a sectional elevation of the apparatus shown in FIG. 1.

FIG. 3 is a plan view of the drive mechanism in FIGS. 1 and 2.

FIG. 4 is a detailed sectional elevation of one of the dewatering presses.

FIG. 5 is a detailed sectional elevation of a dewatering press during the die conditioning operation.

FIG. 6 is a detailed sectional elevation of a dewatering press, ware shift means, the finishing press, and ware transfer mechanism in operation.

FIG. 7 is a sectional elevation of a shift mechanism for transferring the ware from the dewatering press to the finishing press.

FIG. 12 is an elevation of the bank of limit switches controlling the operational cycle of each dewatering press.

FIG. 16 is a diagrammatic view of the turret operation showing the operating cycle of the dewatering presses.

FIG. 17 is an elevation of a control mechanism for the finishing press.

Figure 8:
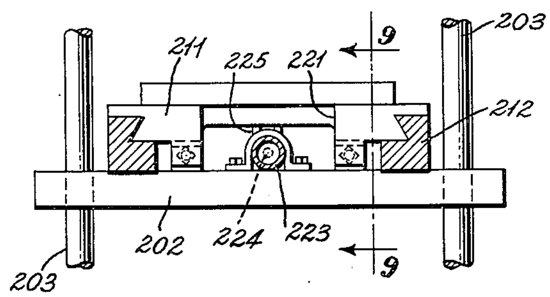
FIG. 8 is a sectional elevation taken along line 8—8 of FIG. 7.

In the assembly shown generally in FIGS. 1, 2, 3 and 4, eight dewatering presses 10 are mounted on a turntable 11. The turntable 11 is mounted on a rotatable axle 12 supported by a stand 13. The turntable 11 is rotated by an electric motor 14 through a reduction gear assembly 15, eccentric sprocket 16, sprocket 17, spring loaded idler sprocket 18, sprocket 19, chain 20, axle 21, vertical beveled gear 22, and horizontal beveled gear 23. The axle 21 is mounted in a bearing 24 in the gear housing 25. Due to the eccentricity of sprocket 16 intermittent motion is imparted to the turntable 11 and to the drive shaft 61.

Each of the dewatering presses 10 comprises a slidably mounted lower die member 26 and a vertically reciprocable upper female die member 27. The upper die member 27 is secured to a horizontal guide platen 28, slidably mounted on four vertical guide bars 29. A switch tripper 30 is mounted on the platen 28 for actuation of a switch 31 (FIG. 4), the function of which subsequently will be described. The upper surface of the platen 28 is secured to a hydraulic piston rod 32 extending downwardly from a hydraulic cylinder 33 mounted on the undersurface of a top plate 34. The guide bars 29 pass through and support the plate 34 which is secured thereto by nuts 35. Hydraulic fluid is introduced into or removed from the hydraulic cylinder 33 above the piston disposed therein through a hydraulic line 36, while hydraulic fluid is introduced into or removed from the cylinder 33 below the piston through a hydraulic line 37.

Foraminous walled conduits 38 are disposed in the lower die member 26 and the upper die member 27 for application of fluid pressure or vacuum to the porous die members. The conduits 38 are in communication with headers 39 which are in turn connected to fluid lines 40 and 41, respectively, through which air may be furnished or exhausted by means of the valving system shown in FIG. 10.

As shown more particularly in FIGS. 4 and 5, the lower male die member 26 of each of the dewatering presses 10 is disposed on a sliding platform 42 keyed in sliding relationship in a base plate 43. A piston 44 is disposed in a chamber of a hydraulic cylinder 45 formed in the sliding platform 42. The piston rod 46 is threadedly anchored in the base plate 43 at 47. An inlet 48 is formed in the sliding platform 42, bringing the chamber 45 behind the piston 44 into communication with a fluid supply line 49. A threaded, centrally orificed plug 50 closes the outer end of the chamber 45. A fluid supply line 51 is in communication with the chamber 45 on the outer side of the piston 44 through the orifice 52 in the plug 50. Introduction of pressurized fluid to chamber 45 through the fluid line 51 causes the sliding platform 42 to move outwardly from the base plate 43 into charging position as shown in FIG. 4. Introduction of pressurized fluid to chamber 45 through line 49 causes retraction of the sliding platform 42 to its normal operating position in the base plate 43, and brings the male die 26 into operating alignment with the female die 27. Air nozzles 53 are mounted on the base plate 43 (FIG. 5) to direct air against the surfaces of the dies 26 and 27 during the die conditioning operations. Air is furnished to the nozzles 53 through a supply line 54.

With particular reference to FIG. 3, drive means for the ware transfer and turntable locking mechanism is shown. Beveled gears 55 and 56 are mounted on an axle 57, which is supported by a bearing 58 mounted in the gear housing 25 and a bearing 59. Beveled gear 55 is actuated by horizontal beveled gear 23. Beveled gear 56 actuates beveled gear 60 mounted on a horizontal axle 61 which is maintained in position by bearing members 62. Beveled gear 63 mounted on horizontally disposed axle 64 is actuated by beveled gear 65 mounted on the axle 61. The axle 64 is maintained in position by supported bearing members 66 and 67. A cam 68 is mounted on the axle 64 and engages a spring loaded locking mechanism 69 for the turntable 11. A switch tripper 235 with two tripper arms 236 and 237 is mounted on the axle 61.

Referring particularly to FIGS. 1 and 2, ware transfer means are shown which comprise three fork-like transfer arms 70 integrally joined to a reciprocable sleeve 71. The sleeve 71 is keyed to a vertical axle 72 which passes through a collar 73 integral with sleeve 71. A horizontally disposed beveled gear 74 is secured to the lower end of the axle 72. The gear 74 is actuated by a vertical beveled gear 75 mounted on a horizontally disposed axle 76 passing through journaled support members 77 and 78. A beveled gear 79 mounted on axle 76 is actuated by beveled gear 80 mounted on axle 61. The collar 73 secured to the sleeve 71 rests upon a cam 81 mounted on horizontal axle 76. The rotation of axle 61 causes rotation of the axle 76 which in turn causes rotation of the square axle 72 through beveled gears 74 and 75. The rotation of the axle 80 also causes rotation of cam 81 which results in vertical reciprocation of the collar 73, the sleeve 71, and the ware transfer arms 70. The ware transfer mechanism is supported on a stand 82.

As shown particularly in FIGS. 1 and 2, each of the dewatering presses 10 disposed on the turntable 11 is hydraulically actuated through lines 36 and 37 which lead to individual hydraulic valving means 90 connected by a header 91 to a hydraulic pump 92 through a hydraulic relief valve 93. Each valving mechanism empties into a common hydraulic sump 94 through outlets 95.

Hydraulic fluid is supplied by the sump 94 to the hydraulic pump 92 through conduit 96 which extends below the fluid level in the sump and is equipped with a filter 97. The hydraulic pump 92 is actuated by an electric motor 98 through shaft 99. Each of the hydraulic valving mechanisms 90 is equipped with a needle restriction valve control 100, which regulates the size of a restriction 110 (FIG. 13), which in turn controls the amount of fluid flowing through fluid line 36 as will be subsequently described.

Figure 11:
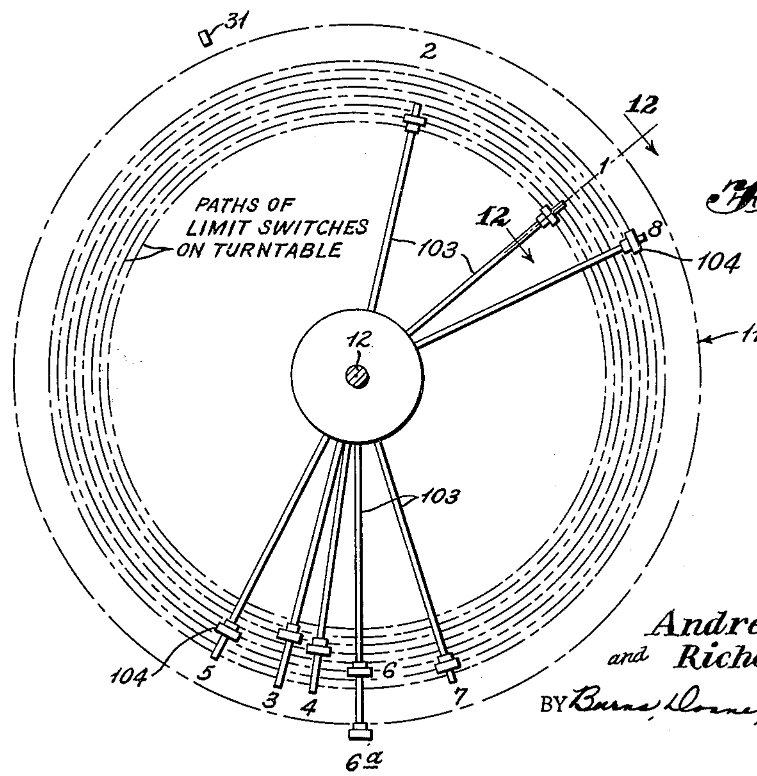
FIG. 11 is a plan view of the limit switch tripping mechanism disposed under the turntable of the turret shown in FIG. 1.

With particular reference to FIGS. 1, 11, 12 and 15, a separate electrical control box 101, containing the component relays, limit switches and the like, is mounted on the turntable 11 for each dewatering press 10. Each control box contains eight micro-limit switches, the actuating plungers 102 of which extend through the turntable 11. These switches have been assigned numbers 1 through 8 to designate the particular phase of the operation (shown diagrammatically in FIG. 16) which is controlled by the particular limit switch. Rigidly mounted beneath the turntable 11 on the supporting stand 13 are eight limit switch tripper arms 103 having switch trippers 104 suitably mounted thereon to engage and actuate the microswitch plungers 102 as the turntable 11 is rotated. The paths of the limit switch plungers are shown by the dotted lines in FIG. 11. Also shown in FIG. 11 is the disposition of the limit switch tripper arms for the particular operating cycle of the invention to be subsequently described in conjunction with FIGS. 1, 2 and 16.

An orifice 105 is formed near the outer edge of the turntable 11 adjacent each dewatering press 10 for coaction with a table locking means subsequently described.

Figure 15:
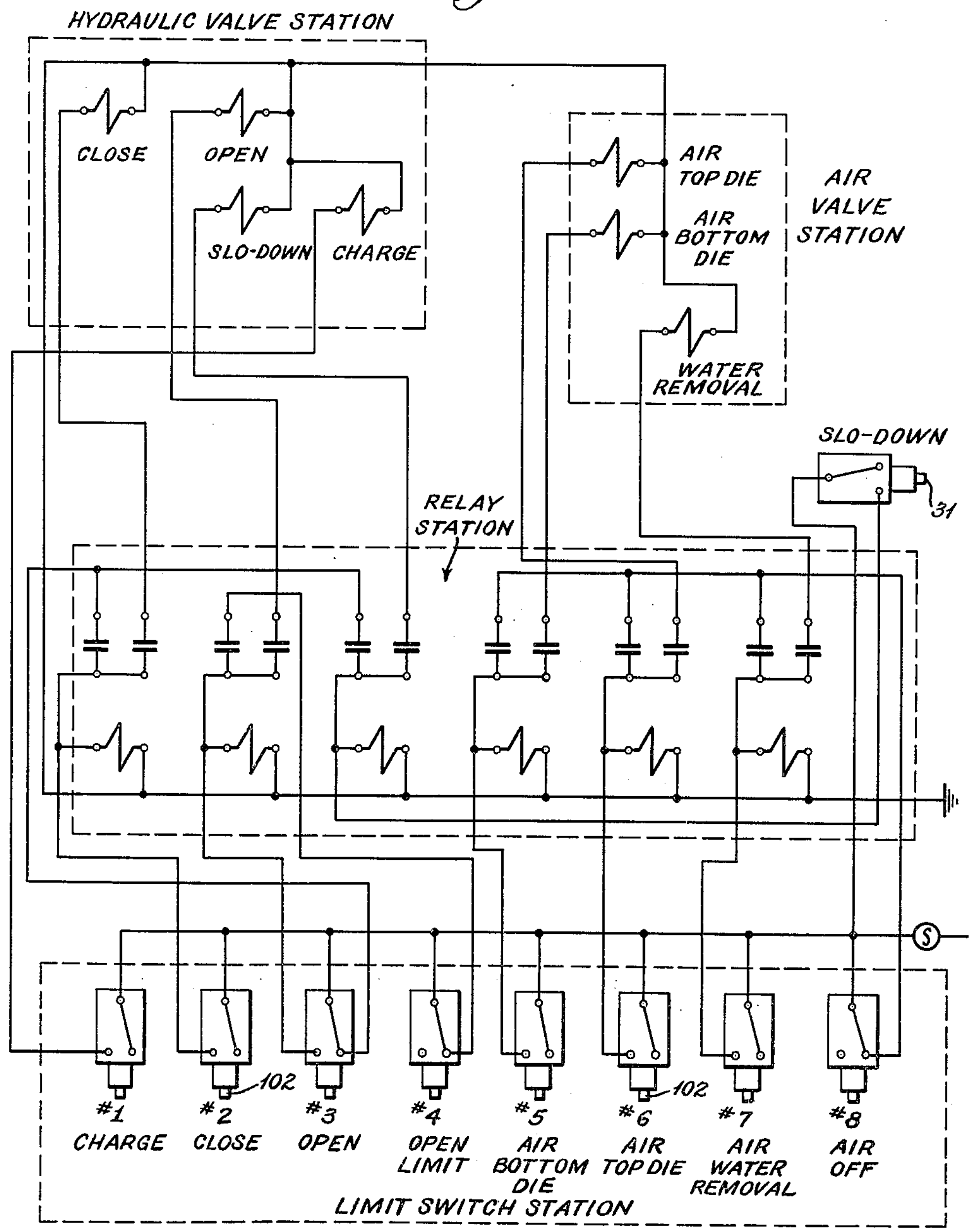
FIG. 15 is a wiring diagram for the dewatering press electrical system.

A wiring diagram, including microswitches 1 through 8 of each limit switch control box 101, slow-down switch 31 and the component relays, is shown in FIG. 15. The functioning of circuits shown will become apparent as the operation of the apparatus is described.

With particular reference to FIGS. 1, 2, 6, 7, 8, 9, and 17, a finishing press 200 is supported on a stand 201. A vertically reciprocable platen 202 is mounted on guide bars 203 and is secured to piston rod 204 of hydraulic cylinder 205. Hydraulic fluid is introduced to or removed from the cylinder 205 above the piston through fluid line 206 and is introduced to or removed from the cylinder 205 below the piston through line 207. Hydraulic fluid is contained within a sump 208 within the support 201 and pressure is supplied by an electric motor and pumping unit 209. A ware transfer assembly 210 is mounted on vertically reciprocable platen 202. A sliding ware transfer table 211 is keyed into the base 212 of the ware transfer assembly 210. A male finishing die 213 is mounted on one end of the sliding ware transfer table 211 and in its normal position is in operating alignment with a female finishing die 214 secured to a stationary top plate 215. Preferably, the dies of the finishing press are in their closed position adjusted about .010 to .015 of an inch closer together than are the dewatering dies in their closed position. Foraminous walled conduits 216 are formed in porous dies 213 and 214 and are in communication with headers 217 and 218 to which pressurized air is supplied through lines 219 and 220, respectively.

A slot 221 (FIG. 1) is formed in the end of the sliding table 211 opposite the male die 213 to permit vertical passage therethrough of the ware transfer arm 70 as shown in FIGS. 1 and 6. Guide bars 203 pass through the plate 215 and are secured by nuts 222. A hydraulic cylinder 223 (FIG. 7) is longitudinally disposed on platen 202 under sliding ware transfer table 211. A piston rod 224 attached to the piston in hydraulic cylinder 223 is pivotally secured to flange 225 depending from the end of the sliding ware transfer table 211 facing the turntable 11. Hydraulic fluid is introduced to or removed from one end of the chamber of the hydraulic cylinder 223 in the table 11 through fluid line 226 and inlet 227. Hydraulic fluid is introduced to or removed from the chamber at the opposite side of the piston in the hydraulic cylinder 223 through inlet 228 and hydraulic line 229. When fluid is introduced through line 226 and inlet 227, the sliding table 211 is extended into the dewatering press 10 as shown in FIGS. 6 and 7. When hydraulic fluid is introduced into the cylinder through line 229 and inlet 228, the sliding table is moved in the opposite direction until the male die 213 again registers with the female die 214 of the finishing press 200.

With particular reference to FIGS. 6 and 17, an electrical switch box 230 in which are mounted microswitches D, E and F, is secured to one of the guide bars 203. A cam-slide switch actuating member 231 is mounted on and reciprocates with the platen 202 of the finishing press 200. The actuating plungers of the microswitches D, E and F extend into grooves 232 of predetermined length formed in the slide 231 and are depressed by inclined cam surfaces forming the ends of the grooves 232 of cam slide 231 when the reciprocation of the platen 202 causes the slide to travel a distance relative to the microswitch plungers greater than that permitted by the grooves 232.

A microswitch C is mounted on one of the guide bars 203 of the finishing press 200 and is actuated by tripper 233 mounted on the table 211 when the table 211 is fully extended into the dewatering press 10 in the position shown in FIG. 6. A switch G is also mounted on the guide bar 203 of the finishing press 200 and is actuated by the tripper 234 mounted on the base 212 of the ware transfer assembly 210 when the assembly 210 is raised by hydraulic cylinder 205. Electrical switches A and B (FIGS. 1 and 2) are mounted on the frame 201 of the finishing press 200 and are tripped by the revolving tripper arms 236 and 237 of the switch tripper 235 mounted on the axle 61.

With particular reference to FIGS. 2 and 6, a spring loaded locking mechanism 69 is provided to lock the turntable in position for transfer of the ware from the dewatering press 10 to the finishing press 200. The mechanism comprises a spring loaded plunger 238 mounted in a bracket 239 which is secured to the guide bar 203 of the finishing press 200. The plunger 238 rides on and reciprocates with the cam 68.

Figure 13:
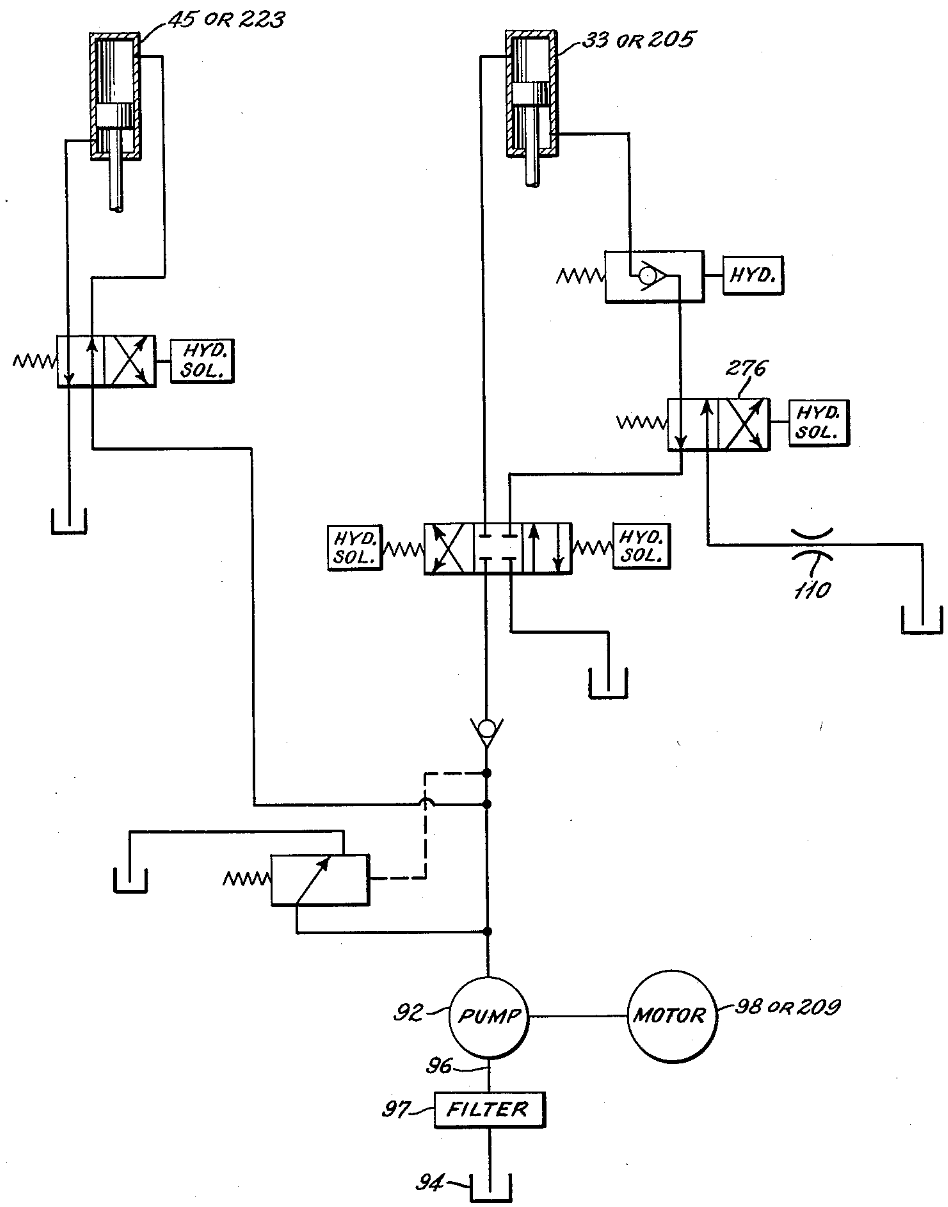
FIG. 13 is a schematic diagram of the hydraulic system employed for each of the dewatering presses and the finishing press.

In FIG. 13 is shown a hydraulic system for operation of each of the dewatering presses and the finishing press. The functioning of this system will become apparent as the operation of the apparatus of the invention is described.

Figure 10:
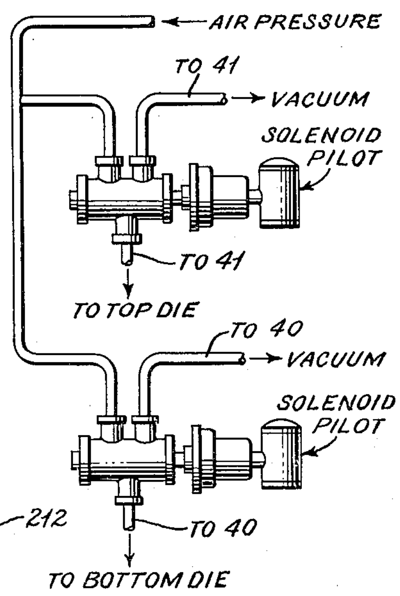
FIG. 10 is a schematic diagram of an air valving means employed in conjunction with the bewatering presses.
Figure 9:
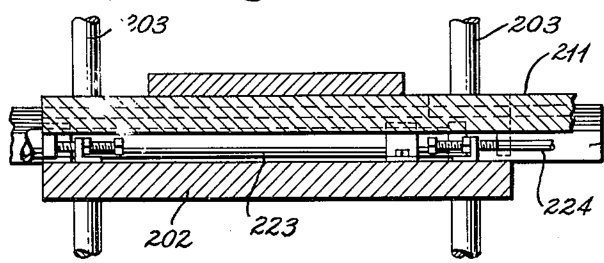
FIG. 9 is a sectional elevation taken along line 9—9 of FIG. 8.

In FIG. 10 is shown an air valving system incorporating three-way solenoid valves for applying fluid pressure and vacuum to the dies of the dewatering and finishing presses. Vacuum is applied to the dewatering press die members through the normal open porting of the three-way valves (FIG. 10) until actuation of a limit switch causes fluid pressure to be applied. The functioning of this system will also become apparent as operation of the apparatus is described.

Figure 14:
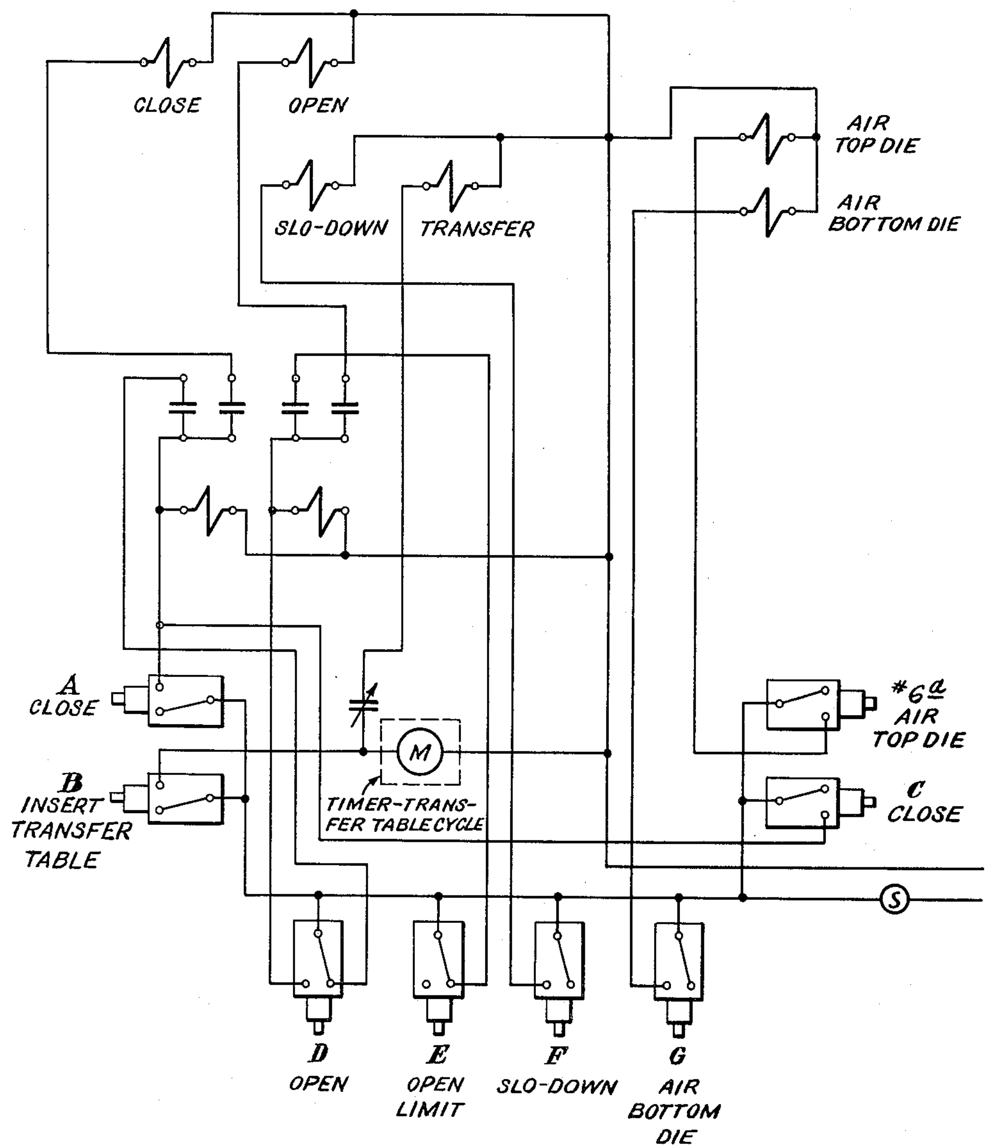
FIG. 14 is a wiring diagram for the finishing press electrical system.

In FIG. 14 the electrical circuit employed for operation of the finishing press 200 is shown. This circuit includes switches A and B which are actuated by the revolving tripper 235; switch C which is actuated by the horizontal movement of the ware transfer table 211; switches D, E, F and G which are actuated by the vertical movement of the ware transfer assembly 210; and switch 6A which is simultaneously actuated with switch 6 by the switch tripper 104 mounted under the turntable 11. Also shown is the electrical timer M which is actuated by switch B. The functioning of the circuit shown will be apparent from the description of the operation of the apparatus of the invention.

The operation of the apparatus as specifically disclosed in the drawing will be described with particular reference to FIGS. 15 and 16 and with respect to the positions diagrammatically shown in FIG. 16. The electric motor 14 is turned on, causing the drive mechanism to rotate the turntable 11. When the first dewatering press reaches the position shown at I, the tripper 104 at the end of the tripper arm 103 actuates limit switch 1 which causes hydraulic fluid to flow through line 51 into the chamber 45 of the hydraulic cylinder in the sliding platform 42 of the base member 43 of the dewatering press. The platform 42 is extended in charging position and a batt of clay is placed upon the male die 26 by means not shown. As the turntable 11 continues to rotate toward position II, limit switch 2 is tripped. Hydraulic pressure is released in line 51 and fluid is introduced to chamber 47 through line 49 and the sliding platform 42 is returned to its starting position. Hydraulic fluid is caused to flow under high presure through line 36 into hydraulic cylinder 33 to rapidly close the press 10 for substantially all of the downward travel of the female die 27, preferably to within about one-fourth inch of its closed position. As the turntable continues to rotate to position III, the slow-down switch tripper 30 trips slow-down switch 31 (FIG. 15) diverting the flow of hydraulic fluid through a controlled restriction 110 (FIG. 13) in line 36, thus causing the remaining travel of die 27 to be materially slowed so that the dies do not reach their fully closed position for, preferably, from ten to thirty seconds. Throughout this period, vacuum is being applied to the dewatering dies 26 and 27 through lines 40 and 41. Application of vacuum during the relatively long period of slow squeeze materially assists in dewatering both the clay and the dies. Both water and fine particles of clay are absorbed by the porous structure of the dies. Any air trapped between the clay and the die surfaces is also drawn into the porous die structure. Vacuum and slow squeeze are applied as the dewatering press is rotated from position III to position V.

As the turntable 11 rotates to move the dewatering press 10 from the position V toward the position VI, switch tripper 236 actuates switch A mounted on the stand 210 of the finishing press 200. Hydraulic fluid is thereby introduced through the line 207 to raise the ware transfer assembly 210 and finish press the dewatered ware transferred from the preceeding dewatering press. As the ware transfer assembly 210 is raised, limit switch F is tripped by cam slide 231 to divert the flow of hydraulic fluid through a needle restrictor 110 (FIG. 13) and thus effect slower travel in the final upward movement of the assembly 210. As the assembly 210 reaches the upper limit of travel and the ware finishing stroke is completed, limit switch G is actuated by tripper 234 and limit switch D is actuated by cam slide 231. The actuation of the switch G causes introduction of pressurized fluid to the lower male die 213 of the finishing press 200 to release the ware therefrom while actuation of switch D causes flow of hydraulic fluid to the cylinder 205 through line 206 to lower the assembly 210. At the lower limit of travel of the assembly 210, limit switch E is actuated by cam slide 231 to cut off flow of hydraulic fluid to the hydraulic cylinder 205.

During rotation of the turntable 11 to move the dewatering press 10 from position V toward the position VI, limit switch 5 also is actuated, causing pressurized air to now flow through line 40 into header 39 and to be discharged from the face of the male die 26 of the dewatering press 10, thus freeing the dewatered ware from the lower male die member as the dewatering press approaches position VI. The pressurized air blows water and fines absorbed by the die back onto the lower surface of the dewatered clay body. Limit switch 3 is next actuated whereupon hydraulic fluid is caused to flow through line 37 into the hydraulic cylinder 33 and the female die 27 is raised with the dewatered ware adhering thereto. Limit switch 4 is actuated when the female die 27 is at the top limit of its travel and the dewatering press reaches position VI. At this point, the tripper 237 on cam 235 activates the limit switch B, limit switches 6 and 6a are actuated by turntable tripper arm 103 and the plunger 238 is raised by cam 68 to enter orifice 105 and lock the turntable in registered position for removal of the dewatered ware from the dewatering press and transfer of the ware to the finishing press 200.

Actuation of the tripper switch B causes hydraulic fluid to flow through line 226 into the hydraulic cylinder 223 in the sliding ware transfer table 211 to extend the table into the open dewatering press until the lower male die member 213 of the finishing press registers in operating alignment with the upper female die member 27 of the dewatering press. Actuation of the switch B also initiates a time interval through the electric timer M (FIG. 14). As the ware transfer table 211 reaches its extended position into the dewatering press switch C is actuated, causing the hydraulic fluid again to be introduced through line 207 to hydraulic cylinder 205 to raise the ware transfer assembly 210 and bring the male die 213 on the extended ware transfer table 211 into close, contiguous relationship with the dewatered ware. Similarly, the opposite end of the ware transfer table 211 is brought into close, contiguous relationship with the upper female die 214 of the finishing press 200 to receive the finished ware As in the previously described cycle of the finishing press, limit switch F is tripped by cam slide 231 to again effect slower travel in the final upper movement of the transfer table 211.

Actuation of the limit switches 6 and 6a by the turntable tripper arm 103 has in the meantime caused introduction of pressurized air through line 41 to header 39 to free the dewatered ware from the surface of the upper female die 27 of the dewatering press 10 and through line 220 and header 218 to the uper female die 214 of the finishing press to free the finished ware therefrom. The dewatered ware freed from the female die 27 of the dewatering press is deposited on the male die 213 of the finishing press while the finished ware freed from the female die 214 of the finishing press is deposited onto the end of the ware transfer table 211 opposite the male finishing die 213.

As in the previous cycle, switch D is actuated by cam slide 231 as the assembly 210 reaches the upper limit of travel. The flow of hydraulic fluid to cylinder 205 is thereby reversed and the assembly 210 is lowered.

At the lower limit of travel of the table 211, limit switch E is again actuated by cam slide 231 to cut off flow of hydraulic fluid to the hydraulic cylinder 205. At this point the end of the interval timed by electric timer M is reached and hydraulic fluid is introduced into the hydraulic cylinder 223 in ware transfer table 211 through line 229 and the table is returned to its original position, thus transferring the dewatered ware into operating position under the female die 214 of the finishing press 200 and moving the ware finished in the previous cycle to a position over ware transfer arm 70.

At this point the intermittently rotating shaft 61 now rotates the cam 68, spring loaded plunger 238 is withdrawn from orifice 105 and rotation of the turntable is resumed. As the next dewatering press moves from position V to position VI, the switch A mounted on stand 210 of the finishing press 200 is again actuated by tripper 236 and the entire cycle is repeated. During the finish pressing operation, the ware transfer arms 70 are raised by cam 82; one arm passes through the slotted end of the ware transfer table 212 and the finished ware is removed to means (not shown) for subsequent drying and finishing operations. Because of the improved consolidation of the ware achieved by the dewatering and finishing operations, the ware may be transferred unsupported to subsequent operations.

During the second reciprocation of the ware transfer assembly 210 in the cycle described, air is also introduced to the male die 213 of the finishing press 200, thus bringing to the die surface any water absorbed in the previous pressing operations to aid in the next finished pressing cycle.

The rate of dewatering die closure during the period in which the dewatering pressure is slowly applied, in accordance with the invention, will depend on the particular operation. From the sole standpoint of excellency of product, the slowest possible rate of closure amenable to economical production rates is preferred. Where a plurality of dewatering presses are mounted on a turret, as in the preferred embodiment, it is apparent that as the number of dewatering presses on the turntable is increased, the rate of closure of the die members may be correspondingly slowed for a given output. In general, however, a marked improvement in product is obtained when the maximum rate of die closure during the period of slow application of dewatering pressure is twenty inches per minute. Rates of closure of less than five inches per minute are especially preferred.

The slowness of application of the final dewatering pressure, in accordance with the invention, results in a materially greater change in clay characteristics in terms of both water and grain movement than in prior pressing techniques. Consequently, the strains and the tendency to return to the original configuration of the batt which characterized the dewatered ware of the prior art have been substantially completely eliminated. Moreover, the gradual application of pressure permits an effective use of vacuum not possible in prior pressing techniques. The slow squeeze itself, said especially with concurrent application of vacuum to the dewatering dies, permits a heretofore unachieved dewatering efficiency and products a ware which is dewatered to the point where it may be subsequently processed in an unsupported condition and where shrinkage during drying is practically completely eliminated.

An additional and important advantage of the gradual application of final dewatering pressure, especially with concurrent application of vacuum to the dewatering dies, lies in the absorption by the dies of clay fines and increased amounts of water. In the normal pressing techniques, an acceptably smooth final surface is obtained due to the fact that fines are transported to the surface of the ware by the water moving from the body of the clay. As previously indicated, however, the dewatered ware of the conventional processes cannot be handled unsupported and drying shrinkage is obtained due to the amount of water left in the ware. As a result of the greater dewatering efficiency of the method and apparatus of the invention, the "movable" water has been removed and, consequently, the desired fines are not carried to the surface during the finish-pressing operation. However, in the process of the invention, the amount of fines and water absorbed by the dies and known back on the ware surface by the releasing air is sufficient to produce an excellent surface in the finishing press and/or subsequent drying operations. Although excellent results may be obtained without application of vacuum during the dewatering operation, ware of improved surface characteristics is produced when the reduced pressures are employed.

In the process of the invention, the more efficient application of vacuum during the dewatering of the ware provides the additional important advantage of removing air from between the surface of the formed clay charge and the die surface. Complete removal of this air is especially critical where the dies have suffered disfiguration from use or else are characterized by irregular configurations for design purposes. In normal processing, these irregularities are often sealed over with clay and the air thus trapped causes disfiguration or flaws in the pressed piece. By the present process, however, the air is more easily removed and the imperfections normally occurring from trapped air are substantially completely eliminated.

Thus, ware produced in accordance with the invention is characterized by enhanced dryness and structural strength, greater uniformity, freedom from strains, and an improved surface finish.

From the general and specific description of the method and apparatus of the invention, it will be apparent that substitution of equivalent mechanical elements and equivalent manipulative procedures may be made without departing from the scope of the invention. For example, both the dewatering presses and the finishing press may be pneumatically instead of hydraulically actuated. Hydraulic actuation is preferred from the standpoint of more economical operation, but any fluid actuating medium or mechanical actuating means may be substituted as desired.

Although it is preferred that the apparatus of the invention be constructed and operated as specifically described, it is, of course, apparent that a single dewatering press may be employed in conjunction with a single finishing press. Moreover, it is not necessary that the same drive means be employed for actuating or controlling the turntable, the finishing press and the ware transfer mechanism. In fact, it is unnecessary to employ a ware transfer mechanism if, in a particular operation, it is desired to manually remove the ware from the finishing press. Means of supplying power other than an electric motor may be employed if desired, and it is apparent that different gearing mechanisms may also be utilized. Instead of a drive system for the turntable, such as that specifically disclosed, a suitable Geneva system may be employed.

In view of these and other modifications that can be made by those skilled in the pottery art, it is intended that the invention be limited solely by the scope of the appended claims.

We claim:

1. A method for manufacturing ceramic ware which comprises rapidly applying dewatering pressure to a water-containing clay body until the body is partially dewatered and partially shaped, and then applying dewatering pressure to gradually complete the dewatering and preliminary shaping of the clay body at a slower rate of not more than about 20 inches per minute and for a period to eliminate strains and ware-distorting forces in the clay body and to dewater the clay body to the degree that shrinkage water is removed from the clay body and the clay body may be subsequently processed in an unsupported condition.

2. A method according to claim 1 wherein the slower application of dewatering pressure is effected at a rate of less than about 5 inches per minute.

3. A method for manufacturing ceramic ware which comprises rapidly applying dewatering pressure to a water-containing clay body by means of porous, mating dies until the body is partially dewatered and partially shaped, and then applying dewatering pressure by means of said dies to gradually complete the dewatering and preliminary shaping of the clay body at a slower rate of not more than about 20 inches per minute and for a period to eliminate strains and ware-distorting forces in the clay body and to dewater the clay body to the degree that shrinkage water is removed from the clay body and the clay body may be subsequently processed in an unsupported condition.

4. A method for manufacturing ceramic ware which comprises rapidly applying dewatering pressure to a water-containing clay body by means of porous, mating dies until the body is partially dewatered and partially shaped, then applying dewatering pressure by means of said dies to gradually complete the dewatering and preliminary shaping of the clay body at a slower rate of not more than about 20 inches per minute and for a period, to force water from the wet clay mass and clay fines into the porous dies, to eliminate strains and ware-distorting forces in the clay body and to dewater the clay body to the degree that shrinkage water is removed from the clay body and the clay body may be subsequently processed in an unsupported condition, introducing pressurized air to the porous dies to release the ware therefrom and to coat the surface of the internally dewatered ware with water and fines blown back from the dies, pressing the surface wet ware in a finishing press having dies of closer mating tolerance to finally shape and surface finish the ware, removing the ware from the finishing press and transferring the unsupported ware from the apparatus.

5. A method according to claim 4 wherein the slower application of dewatering pressure is effected at a rate of less than about 5 inches per minute.

References Cited in the file of this patent

UNITED STATES PATENTS

| | | |
|---|---|---|
| 1,559,513 | Ward | Oct. 27, 1925 |
| 1,613,500 | Chamberlain | Jan. 4, 1927 |
| 1,860,075 | Byerlein et al. | May 24, 1932 |
| 1,993,047 | Westman | Mar. 5, 1935 |
| 2,191,857 | Miller | Feb. 27, 1940 |
| 2,290,129 | Moreland et al. | July 14, 1942 |
| 2,301,939 | Fischer | Nov. 17, 1942 |
| 2,408,803 | Miller | Oct. 8, 1946 |
| 2,584,109 | Blackburn et al. | Feb. 5, 1952 |
| 2,638,654 | Jordon | May 19, 1953 |
| 2,718,662 | Bohannon et al. | Sept. 27, 1955 |
| 2,745,135 | Gora | May 15, 1956 |
| 2,770,025 | Mollers | Nov. 13, 1956 |
| 2,805,447 | Voges | Sept. 10, 1957 |

OTHER REFERENCES

Searle: "Encyclopedia of the Ceramic Industries," vol. 3 (1930), page 130. (Copy in Div. 15.)